March 2, 1937.　　　R. IKEDA ET AL　　　2,072,753
FOLDING BOX
Filed July 29, 1935
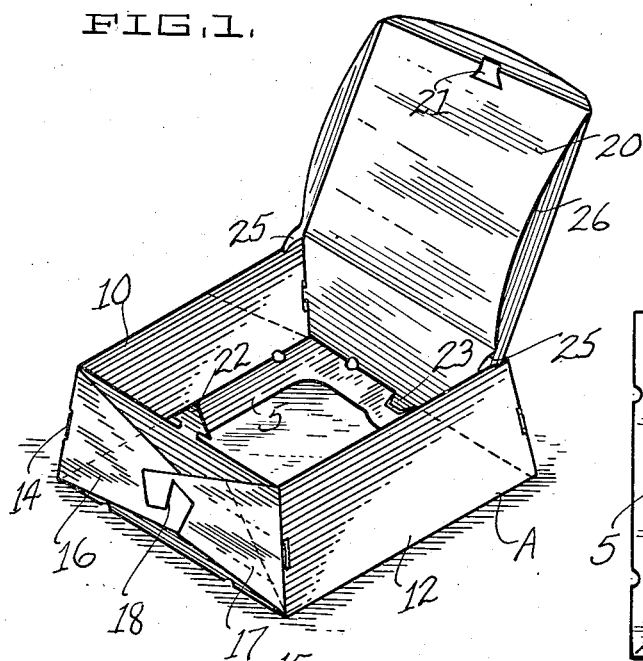
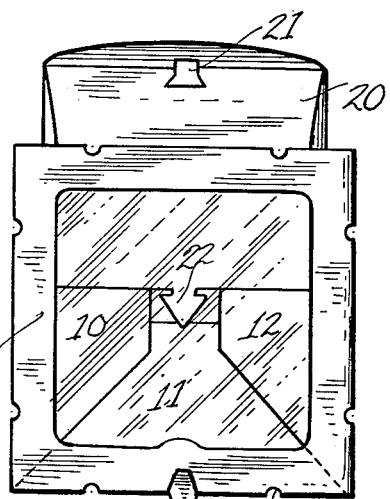
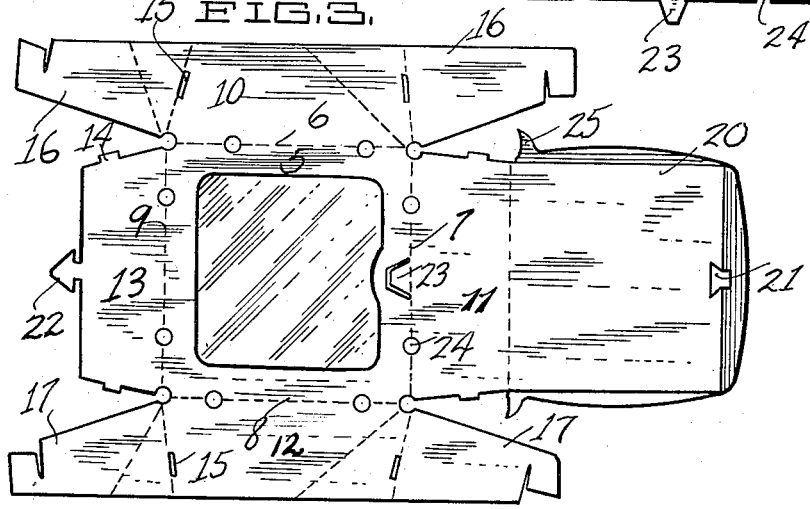
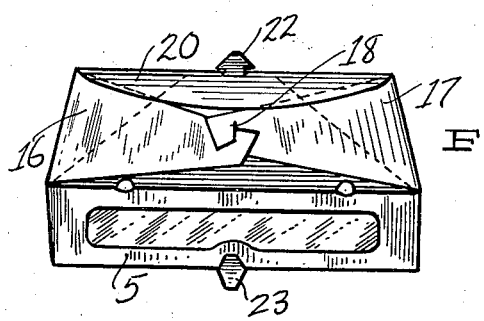
INVENTORS.
RIHACHI IKEDA
SHUZO SATAKE
BY Victor J. Evans & Co.
ATTORNEYS.

Patented Mar. 2, 1937

2,072,753

UNITED STATES PATENT OFFICE 2,072,753

FOLDING BOX

Rihachi Ikeda and Shuzo Satake, San Mateo, Calif.

Application July 29, 1935, Serial No. 33,760

2 Claims. (Cl. 229—36)

This invention relates to improvements in folding boxes and has particular reference to that type termed berry boxes or fruit baskets.

An object of the invention is to provide a receptacle, made from a single sheet of material, which can be stored or shipped in a substantially flat condition and can be manually coverted into a set-up condition to present a strong, sturdy, economical box construction by the unique arrangement employed of interlocking tongues and tabs.

Another object of the invention is to make the box sanitary by providing in the box a window, made of "Cellophane" or similar transparent material, whereby the contents of the box may be readily viewed, which window may be employed in either the top or bottom of the receptacle, or if desired, in both the top and bottom of said receptacle.

A further object of the invention is to provide a novel arrangement of the box tabs that will serve the dual function of both interlocking certain of the box parts and serving as finger holds when it is desired to lift the box from crates and the like.

Other objects and advantages will be apparent during the course of the following description.

In the accompanying drawing forming a part of this specification and in which like numerals are employed to designate like parts through the same, Fig. 1 is a perspective view of the box with the lid raised.

Fig. 2 is a plan view of the box in collapsed condition.

Fig. 3 is a plan view of a blank made in accordance with our invention, and

Fig. 4 is a bottom prospective view, illustrating to advantage the "Cellophane" bottom and the interlocking tabs of one of the sides of the box.

There is great need in the box industry for an economically constructed, simple, and collapsible, as well as, sanitary berry or fruit box or receptacle. To comply with the Pure Food laws, inspection is frequently made by those in authority to ascertain the condition of berries or like articles placed in boxes. The condition of the berries at the base of the box cannot be readily determined unless the inspector inserts his fingers into the berries to determine the condition of the fruit that rests on or is adjacent to the bottom of the box. To thus provide a means whereby the condition of the fruit may be readily viewed from the bottom of the box we have employed in the present box construction a transparent window. Thus the condition of said fruit may be readily viewed by the inspector without necessarily disturbing and sometimes bruising the fruit in the box. Merely by lifting the lid of the box, if the box should be closed, the inspector can readily determine the condition of the fruit at the top of the box. Considerable annoyance and inconvenience have likewise been occasioned due to the fact that certain type of boxes are of such a bulky nature that they cannot be readily transported or stacked for use. To, therefore, provide a unique box arrangement that will be sanitary in every respect and which because of its collapsible nature can be readily stored or packed for shipment, we have devised our present invention wherein the reference character A designates a box constructed in accordance with our invention. The box, as before stated, is made of a single blank of material, referring specifically to Fig. 3, the numeral 5 designates the bottom of the box that is creased or scored as at 6, 7, 8, and 9 to permit a bending of the blank to provide sides 10, 11, 12, and 13. The sides 11 and 13 have provided on their marginal edges tongues 14 that are adapted to engage openings 15 provided in the sides 10 and 12. Extending from the sides 10 and 12 are wings 16 and 17 disposed in opposite directions and capable of being folded in the rear of the respective sides 11 and 13 and are adapted to interlock adjacent their extremities as at 18. By virtue of this formation of the respective side walls and interlocking wings of the box a most sturdy, compact arrangement of the side walls of the receptacle is effected.

Continuing from the side wall 11, which is creased as at 19, is a lid 20 having an opening 21 provided therein for receiving a spear shaped tab 22. It is herein pointed out that this tab serves as a means for not only securing the cover 20 to the side wall 13 when it is desired to lock or close the box, but it also functions as a finger hold to permit a lifting of the box where space is restricted as in crates where the body of the box cannot be readily grasped. A similar tongue 23 is formed from the side wall 11 so that the box may be readily raised when it is in inverted position.

We wish to point out that in larger sized baskets a plurality of tabs 22 may be employed, and these tabs may be made of metal if desired. Referring to Fig. 3, it will be noted that we provide a number of openings 24 which serve as ventilating means when fresh fruit is placed in the box; on the other hand, no openings are used when the box holds dried fruit.

While we have shown interlocking connections for the side walls of the box, it is obvious that the wings 16 and 17 may be adhesively secured if desired. The numeral 25 designates a pair of extensions provided on the marginal edges 26 of the lid 20, which extensions can be readily folded back to retain the cover in an open position as disclosed to advantage in Fig. 1. From the foregoing description, considered in connection with the accompanying drawing, it will be obvious that we have devised a unique arrangement of a one-piece, folding paper box that is compact, sturdy, economical to manufacture and sanitary in every respect.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:

1. A one-piece folding box embodying in its construction a bottom provided with a window opening and four side walls, one of said walls having a lid formed integral therewith, the opposite side wall having a lug form thereon adapted to be received in an opening provided in the lid, said lug serving as a finger hold for lifting the receptacle, the remaining side walls each being provided with a pair of interlocking wings extending in opposite directions adapted to be positioned behind the first mentioned side walls.

2. A one-piece folding box embodying in its construction a bottom provided with a window opening and four side walls, one of said walls having a lid formed integral therewith, the opposite side wall having a spear-shaped lug formed thereon adapted to be received in an opening provided in the lid, said lug serving as a finger hold for lifting the receptacle, the remaining side walls each being provided with a pair of oppositely disposed interlocking wings adapted to be folded behind the first mentioned side walls, and cooperating means embodied in the respective side walls for connecting the same, one to the other.

RIHACHI IKEDA.
SHUZO SATAKE.